(12) United States Patent
Jung et al.

(10) Patent No.: US 10,592,714 B2
(45) Date of Patent: Mar. 17, 2020

(54) PROJECTION APPARATUS AND OPERATION METHOD THEREOF

(71) Applicant: SAMSUNG ELECTRONICS CO., LTD., Suwon-si (KR)

(72) Inventors: Kil-soo Jung, Osan-si (KR); Byung-chul Kim, Suwon-si (KR); Woo-sung Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 15/162,927

(22) Filed: May 24, 2016

(65) Prior Publication Data

US 2017/0171521 A1 Jun. 15, 2017

(30) Foreign Application Priority Data

Dec. 11, 2015 (KR) .................. 10-2015-0177013

(51) Int. Cl.
| | |
|---|---|
| G06K 7/14 | (2006.01) |
| G06Q 50/10 | (2012.01) |
| H04N 21/436 | (2011.01) |
| H04N 5/74 | (2006.01) |
| H04N 9/31 | (2006.01) |

(52) U.S. Cl.
CPC .......... *G06K 7/1404* (2013.01); *G06Q 50/10* (2013.01); *H04N 5/74* (2013.01); *H04N 9/31* (2013.01); *H04N 21/436* (2013.01)

(58) Field of Classification Search
CPC .. G06K 7/1404; H04N 9/3179; H04N 9/3194; G09G 2340/10
USPC ........................................................ 348/746
See application file for complete search history.

(56) References Cited

U.S. PATENT DOCUMENTS

| | | | |
|---|---|---|---|
| 8,052,579 B2 | 11/2011 | Eich et al. | |
| 8,699,039 B2 | 4/2014 | Kitazaki | |
| 8,860,776 B2 | 10/2014 | Long et al. | |
| 8,994,757 B2 | 3/2015 | Surati et al. | |
| 9,052,579 B1 | 6/2015 | Poulad et al. | |

(Continued)

FOREIGN PATENT DOCUMENTS

| | | |
|---|---|---|
| JP | 4401465 B2 | 1/2010 |
| JP | 2010-128133 A | 6/2010 |

(Continued)

OTHER PUBLICATIONS

Communication dated Jan. 27, 2020, issued by the Korean Intellectual Property Office in counterpart Korean Patent Application No. 10-2015-0177013.

*Primary Examiner* — Jefferey F Harold
*Assistant Examiner* — Omer Khalid
(74) *Attorney, Agent, or Firm* — Sughrue Mion, PLLC

(57) ABSTRACT

A projection apparatus and an operation method thereof are provided. The projection apparatus may include a projector, a detector, and a processor. The projector may be configured to project an image to a projection area. The detector may be configured to detect an ID pattern disposed onto the projection area and a position of the ID pattern. The processor may be configured to generate a projection image including content corresponding to the detected ID pattern such that the content is projected to the position corresponding to the detected ID pattern. The processor may be further configured to control the projector to project the generated projection image.

16 Claims, 24 Drawing Sheets

(56) References Cited

U.S. PATENT DOCUMENTS

| | | | |
|---|---|---|---|
| 9,401,129 B2 | 7/2016 | Nakata et al. | |
| 2008/0074560 A1* | 3/2008 | Ichieda | H04N 9/3147 348/739 |
| 2008/0240565 A1* | 10/2008 | Kitazaki | G06F 3/0421 382/175 |
| 2012/0069180 A1* | 3/2012 | Kawamura | G09F 19/18 348/143 |
| 2013/0127998 A1* | 5/2013 | Kobayashi | G01B 11/00 348/46 |
| 2015/0029173 A1* | 1/2015 | Nakata | G09G 5/18 345/213 |
| 2017/0064273 A1* | 3/2017 | Nebashi | G09G 5/00 |
| 2017/0235983 A1* | 8/2017 | Alwesh | G06Q 10/00 235/385 |

FOREIGN PATENT DOCUMENTS

| | | |
|---|---|---|
| JP | 4957327 B2 | 6/2012 |
| JP | 2014160410 A | 9/2014 |
| JP | 2015-43066 A | 3/2015 |
| KR | 101227625 B1 | 1/2013 |

\* cited by examiner

FIG. 3C

| IDENTIFIER | SOURCE APPARATUS | CONTENT |
|---|---|---|
| #1 | SMARTPHONE | SCHEDULE |
| #2 | DESKTOP COMPUTER | PORTRAITS.MOV |
| #3 | PROJECTOR | BACKGROUND.GIF |
| ⋮ | ⋮ | ⋮ |

FIG. 7C

ID
| 0 | 1 | 2 | ...... | 15 | ns # PROJECTION APPARATUS AND OPERATION METHOD THEREOF

CROSS-REFERENCE TO RELATED APPLICATION

This application claims priority from Korean Patent Application No. 10-2015-0177013, filed in the Korean Intellectual Property Office on Dec. 11, 2015, the disclosure of which is incorporated herein by reference in its entirety.

BACKGROUND

1. Field

Apparatuses and methods consistent with aspects of one or more exemplary embodiments relate to a projection apparatus and an operation method thereof and, more particularly, to a projection apparatus to detect an ID pattern and project an image, and an operation method thereof.

2. Description of the Related Art

A projector is an optical device used to display still and moving images such as slide shows, video clips, and the like, by shining a light onto a projection surface. Projectors, such as over-head projectors (OHP) and beam projectors, allow multiple users in a room to view image content simultaneously.

Over the years, projectors have incorporated communications functionality to expand their capabilities. However, although conventional projectors may connect to multiple image sources, the projectors are capable of displaying content from only one image source at a time. For example, a projector connected to a computer and a smartphone may switch between the two image sources but not necessarily receive input from both devices concurrently.

Alternatively, a user could generate a composite image of the data coming from multiple sources, but the user would have to manually merge or juxtapose images together to create the composite image, which is not very convenient or practical.

Accordingly, there exists a need for a simple method to simultaneously project images from multiple image sources.

SUMMARY

According to an aspect of one or more exemplary embodiments, there is provided a projection apparatus comprising a projector, a detector, and a processor. The projector is configured to project an image to a projection area. The detector is configured to detect an identification (ID) pattern arranged on the projection area and to detect a position of the ID pattern. The processor is configured to generate a projection image that includes the content corresponding to the detected ID pattern such that the content is projected to the position of the detected ID pattern, and control the projector to project the generated projection image.

The content may be received from a source apparatus corresponding to the detected ID pattern.

The processor may further generate a projection image including first content corresponding to a first detected ID pattern and second content corresponding to a second detected ID pattern such that the first content is projected to a first position corresponding to the first ID pattern, and that the second content is projected to a second position corresponding to the second ID pattern.

The processor may receive the first content and the second content from at least one source apparatus. For example, the processor may receive the first content from a first source apparatus and receive the second content from a second source apparatus different from the first apparatus.

The processor may generate the projection image by adjusting a size of the content or a shape of the content based on information regarding the size or shape of an area corresponding to the ID pattern. The information may be included in and extracted from the ID pattern.

The processor may generate the projection image by performing image processing, based on information included in the ID pattern regarding an orientation of a three-dimensional object disposed in an area corresponding to the ID pattern, on the content such that a shape of the content corresponds to the orientation of the three-dimensional object.

The processor may generate the projection image by performing image processing, when a user input is received to change a color of the object or a texture of the object, on the content based on the received user input, such that the color or texture of the content is changed accordingly.

The processor may, when the position of the detected ID pattern changes, update the projection image such that the content is projected onto the changed position of the ID pattern.

The projection apparatus may further include storage to store mapping information of the ID pattern regarding a source apparatus and the content. The processor may receive the content corresponding to the detected ID pattern from the source apparatus corresponding to the detected ID pattern based on the mapping information.

The ID pattern may include an identifier that uniquely identifies the ID pattern or information regarding an area to which the content is projected.

According to another aspect of one or more exemplary embodiments, there is provided a method of controlling a projection apparatus. The method may include detecting a position corresponding to an ID pattern disposed onto a projection area, generating a projection image that includes content corresponding to the detected ID pattern such that the content is projected to the position corresponding to the detected ID pattern, and projecting the generated projection image.

The content may be received from a source apparatus corresponding to the detected ID pattern.

The generating may include generating the projection image including first content corresponding to a first detected ID pattern and second content corresponding to a second detected ID pattern such that the first content is projected to a first position corresponding to the first ID pattern, and that the second content is projected to a second position corresponding to the second ID pattern.

The method may further include receiving the first content and the second content from at least one source apparatus.

The generating may include adjusting a size of the content or a shape of the content based on information regarding the size or shape of the area corresponding to the ID pattern. The information may be included in the ID pattern.

The generating may include generating the projection image by performing image processing, based on information included in the ID pattern regarding an orientation of a three-dimensional object disposed in an area corresponding to the ID pattern, on the content such that a shape of the content corresponds to the orientation of the three-dimensional object.

The generating may include, when a user input is received to change a color of the object or a texture of the object, generating the projection image by performing image processing on the content based on the received user input such that the color or texture of the content is changed.

The generating may include, when the position of the detected ID pattern changes, updating the projection image based on the changed position of the ID pattern such that the content is projected at the changed position corresponding to the ID pattern.

The method may further include receiving the content corresponding to the detected ID pattern from a source apparatus corresponding to the detected ID pattern based on mapping information of the ID pattern with respect to the source apparatus and the content.

The ID pattern may include an identifier that uniquely identifies the ID pattern or information regarding an area to which the content is projected.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which:

FIGS. 3A to 3D are views provided to explain a projection position according to an exemplary embodiment;

FIGS. 7A to 7C show an exemplary embodiment for projecting content onto a three-dimensional object;

DETAILED DESCRIPTION OF EXEMPLARY EMBODIMENTS

Figure 1:
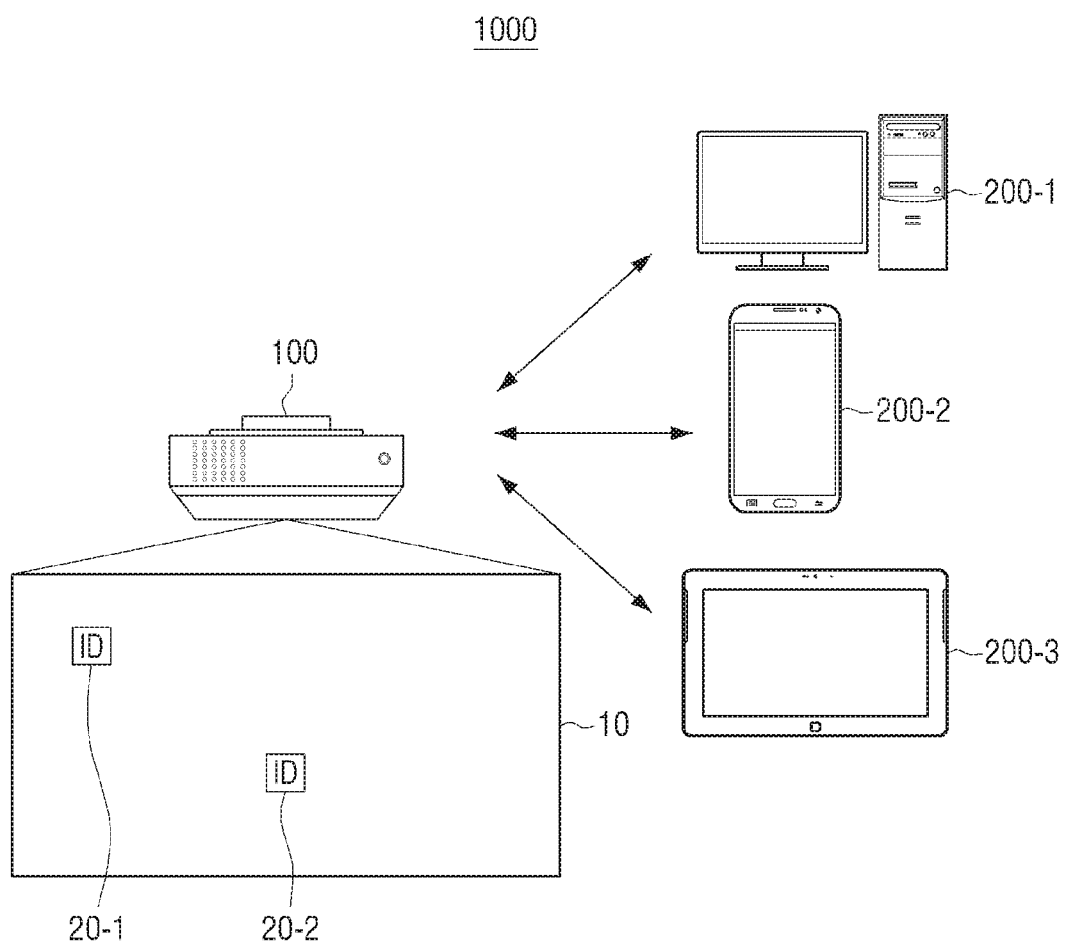
FIG. 1 shows an exemplary projection system.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail to avoid obscuring the disclosure with excessive detail.

Hereinafter, with respect to various exemplary embodiments of the present invention, it will be described with reference to the accompanying drawings. The content set forth in the present specification is not to limit the scope of the present invention to a specific form of embodiment, and should be understood to include various modifications, equivalents, and/or alternatives of the exemplary embodiments. With regard to the description of the drawings, same or the like reference numerals may be used for the like elements.

In addition, the expressions, such as "the first," "the second," and the like, used in the present specification are used to distinguish each and every element of various elements, from each other regardless of the order or importance. Accordingly, the order or importance of the corresponding elements is not limited by such expressions. For example, a first element may be called a second element, and in the same manner, the second element may be changed to and called the first element, without the scope of rights set forth in the present document being extended or altered.

In addition, when it is disclosed that one element (e.g. a first element) is operatively or communicatively coupled, or connected, to another element (e.g. a second element), it should be understood to include to the extent that each of the elements are directly connected to one another, or indirectly coupled through still another element (e.g. a third element). On the contrary, when it is disclosed that an element (e.g. the first element) is "directly coupled," or "directly connected" to another element (e.g. the second element), it may signify that still another element (for example, the third element) exists between the element and the another element.

The terms used in the present disclosure are used to explain an arbitrary exemplary embodiment, and may not intend to limit the scope of another exemplary embodiment. In addition, in the present specification, a singular expression may be used for convenience of explanation, but unless the expression has an obvious different meaning in the context, it may be understood as a concept that includes plural expressions as well. In addition, the terms used in the present specification may have a same meaning with what is commonly understood by those skilled in the art. The terms defined in a general dictionary of all the terms used in the present specification may be understood to have a same or similar meaning with the meaning in the context of the related art, and unless a term is specifically defined in the present specification, the term is not to be understood to have a meaning that is ideal or excessively perfunctory. Depending on the situation, even if a term is defined in the present specification, it may not be understood to exclude exemplary embodiments of the present specification.

Moreover, it should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

Various exemplary embodiments are described in greater detail below with reference to the accompanying drawings.

FIG. 1 shows an exemplary projector system 1000. As illustrated in FIG. 1, the projector system 1000 may include a projection apparatus 100, source apparatuses 200-1, 200-2, 200-3 (collectively "200"), a projection area 10, and identification (ID) patterns 20-1, 20-2 (collectively "20") disposed onto the projection area 10.

The projector system 1000 may refer to a system which projects visual content, such as images and moving images, onto a surface, such as the projection area 10, by shining a light. Thus, the projector system 1000 may be any system capable of shining a slide, a video image, etc. onto the projection area 10 using a light. As illustrated, the projection apparatus 100 may be embodied as a projector such as a beam projector, but the electronic apparatus 100 is not limited thereto, and may be embodied as various types of devices having a beam projector function, such as a smartphone or other mobile devices having a beam projector function added. The projection apparatus 100 may, as a non-limiting example, project an image to the projection area 10.

The projection apparatus 100 may detect the ID patterns 20 disposed on the projection area 10 and respective positions of the ID patterns 20 with respect to the projection area 10. For example, the projection apparatus 100 may detect or recognize pre-stored ID patterns 20 by capturing the projection area 10, and determine a position of the ID patterns 20 in the projection area 10.

The projection apparatus 100 may analyze the ID patterns 20 and extract information therefrom. For example, the electronic apparatus 100 may extract an identifier, information regarding an area corresponding to the ID patterns 20, and the like, from the ID patterns 20.

The projection apparatus 100 may communicate with source apparatuses 200. The projection apparatus 100 may request each of the source apparatuses 200 for content and receive the content.

The projection apparatus 100 may project the content received from the source apparatuses 200 onto the projection area 10. In particular, the projection apparatus 100 may determine source apparatuses 200 corresponding to the ID patterns 20, and project the content received from the source apparatuses 200 to positions corresponding to the ID patterns 20-1, 20-2.

The projection apparatus 100 may store information regarding source apparatuses 200 corresponding to an identifier extracted from the ID patterns 20. In particular, the projection apparatus 100 may be an apparatus that corresponds to the identifier extracted from the ID patterns 20-1, 20-2. In this case, the projection apparatus 100 may project content stored in the projection apparatus 100 to a position indicated by a corresponding ID pattern among the ID patterns 20.

Source apparatuses 200 may communicate with the projection apparatus 100. The source apparatuses 200 may receive from the projection apparatus 100 a request to transmit content, and, in response to the request, transmit corresponding content to the projection apparatus 100.

Each of the source apparatuses 200 may be an apparatus capable of storing content, such as a desktop computer, a laptop computer, a smartphone, a tablet computing device, a wearable computing device, and the like. However, the source apparatus is not limited thereto, and any device or apparatus having a communications capability may be used as one of the source apparatuses 200.

The projection area 10 is an area to which an image may be projected by the projection apparatus 100. The projection area 10 may be various types of flat or non-flat surfaces according to a disposition of the projection apparatus 100. The projection area 10 may also vary according to a projection setting of the projection apparatus 100.

The projection area 10 may include a two-dimensional surface, but may also include a three-dimensional surface. For example, a three-dimensional object may be positioned in the projection area 100.

The ID patterns 20 may be any type of visual pattern capable of storing information. For example, the ID patterns 20 may store an identifier, information regarding an area to which content will be projected, and the like. There is no special limitation as to form or format of the ID patterns 20 as long as an ID pattern is a pattern capable of storing messages or information, such as a Quick Response (QR) code, a barcode, a tag, text, etc. For example, in case the ID patterns 20 are represented as text, the projection apparatus 100 may use optical character reader (OCR) technology to extract the information contained in the text.

The ID patterns 20 may be attached or affixed to the projection area 10 by various means, such as printing, gluing, taping, etc. There is no special limitation as to the size of the ID patterns 20, as long as the ID patterns 20 are of a suitable size recognizable by the projection apparatus 100. For example, the ID patterns 20 may be the smallest size possible to be recognized by the projection apparatus 100. The ID patterns 20 may also function as position markers because the ID patterns 20 may designate the location to which a projection image may be projected with respect to the projection area 10.

Although the projection apparatus 100 is described above as receiving content from the source apparatuses 200 and projecting the content, the disclosure is not limited in that regard. For example, a computer communicatively connected to the projection apparatus 100 may receive ID patterns 20 detected by the projection apparatus 100, and request content from each of the source apparatuses 200 corresponding to the ID patterns 20. The computer may then receive content from the source apparatuses 200, generate a composite image (i.e., projection image) of content received from the various source apparatuses 200 such that appropriate content is projected to respective positions corresponding to the ID patterns 20, and transmit the composite image to the projection apparatus 100 to be displayed on the projection area 10.

Figure 2A:
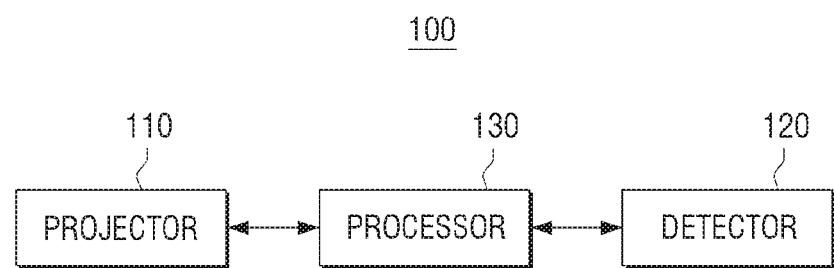
FIG. 2A shows a block diagram of an exemplary projection apparatus.

FIG. 2A shows a block diagram of an exemplary projection apparatus 100.

According to FIG. 2A, the projection apparatus 100 may include a projector 110, a detector 120, and a processor 130.

The projector 110 may project an image (i.e., projection image) by shining a light onto a surface external to the projection apparatus 100. Specifically, the projector 110 may project an image from an external source apparatus or pre-stored content using a light source, such as a lamp, light-emitting diode (LED), etc. The projector 110 may also include a lens or other optical devices to focus the light on to the projection area 10.

The detector 120 may detect an ID pattern disposed on a projection area and a position of the ID pattern. For example, the detector 120 may include a camera. The camera may be configured to capture a still image or a video. In particular, the camera may capture an object placed in front of the projection apparatus 100. The detector 120 may also include a depth map and the like to enhance ID pattern recognition.

The processor 130 may generate a projection image such that appropriate content would be placed within the projection image at a position that corresponds to a corresponding ID pattern detected in the projection area 10. The processor 130 may also control the projector 110 to project the generated image.

From the detected ID pattern, the processor 130 may extract an identifier that uniquely identifies the ID pattern and/or information regarding an area to which content will be projected. For example, the processor 130 may extract information that indicates that an identifier of the ID pattern is 1 and that the area to which a projection image will be projected is a circle having a 10 cm radius and centered at the location of the ID pattern.

The processor 130 may determine a corresponding source apparatus and content based on the extracted identifier. Then, the processor 130 may request content from the source apparatus. In addition, the projection apparatus 100 may further include storage, which may store mapping information between ID patterns, source apparatuses, and content. Then, the processor 130 may receive content corresponding to the detected ID pattern from a source apparatus corresponding to the detected ID pattern, based on the mapping information.

However, the exemplary embodiments are not limited thereto, and the ID pattern may store information regarding content to be displayed via the projection apparatus 100. Specifically, the ID pattern may contain information about what the content is and from which source apparatus the content may be obtained. Thus, the processor 130 may request corresponding content from a source apparatus based on information extracted from the ID pattern, without a need to determine a source apparatus and content.

Additionally, the projection apparatus 100 itself may be a source apparatus that corresponds to a detected ID pattern. In this case, the processor 130 may search whether the content corresponding to the ID pattern is stored in the projection apparatus 100.

The processor 130 may also generate a projection image including content such that the content received from a source apparatus corresponding to a detected ID pattern is projected to a position corresponding to the detected ID pattern. For example, the processor 130 may generate a projection image such that the content is projected to an area in an upper right region of the entire projection area.

The processor 130 may generate a composite projection image that includes first content corresponding to a first detected ID pattern and second content corresponding to a second detected ID pattern such that the first content is projected to a first position corresponding to the first ID pattern, and that the second content is projected to a second position corresponding to the second ID pattern. For example, the processor 130 may, in response to a plurality of ID patterns being detected in a projection area, receive content corresponding to each of the ID patterns and generate a composite image.

In particular, the processor 130 may receive the first content and the second content from at least one source apparatus. That is, the first content corresponding to the first ID pattern and the second content corresponding to the second ID pattern may be stored in one source apparatus or in two or more separate source apparatuses. In addition, the first content and/or the second content may be stored in the projection apparatus 100.

The processor 130 may generate a projection image by adjusting the size or shape of the content based on information extracted from the ID pattern regarding the size or shape of an area corresponding to the ID pattern. For example, the processor 130 may convert a projection image content having an aspect ratio of 16:9 into a circular shape and generate the projection image based on the circular shape.

In particular, the processor 130 may further generate a projection image by performing image processing on the content such that the shape of the content included in the projection image may correspond to an orientation of a three-dimensional object disposed in an area corresponding to the ID pattern, based on information included in the ID pattern regarding an orientation of the three-dimensional object. For example, the processor 130 may generate a projection image by performing image processing on content such that the content corresponds to a three-dimensional mannequin.

In such a case, the processor 130 may, in response to a user input to change a color or a texture of a graphical object being projected, generate a projection image by performing image processing on the content such that the color or the texture of the content may be, based on the received user input.

The processor may further generate, in response to a position of a detected ID pattern being changed, a projection image such that a position at which content is projected may also change based on the changed position of the ID pattern. For example, when a position of an ID pattern is changed by a user, the processor 130 may update the projection image in real time based on the changed position of the ID pattern.

Figure 2B:
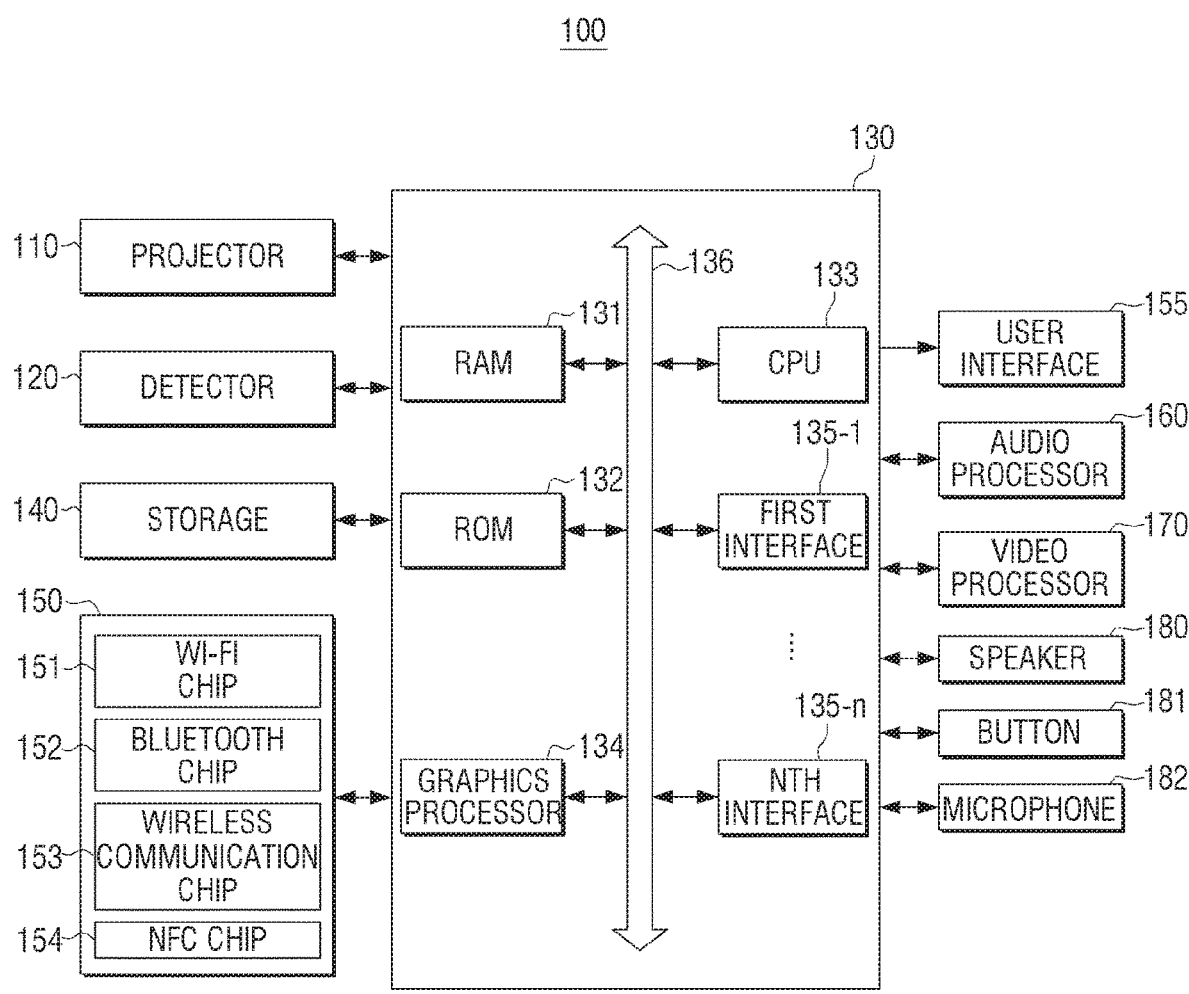
FIG. 2B shows a block diagram of a detailed configuration of an exemplary projection apparatus.

FIG. 2B shows a block diagram of a detailed configuration of the projection apparatus 100. According to FIG. 2B, the projection apparatus 100 may include a projector 110, a detector 120, a processor 130, storage 140, a communicator 150, a user interface 155, an audio processor 160, a video processor 170, a speaker 180, a button 180, and a microphone 182. The description will be omitted with respect to the elements illustrated in FIG. 2B that overlap with the elements illustrated in FIG. 2A.

The processor 130 is to control comprehensively an operation of the projection apparatus 100 using various programs stored in the storage 140.

Specifically, the processor 130 may include a RAM 131, a ROM 132, a central processing unit (CPU) 133, a graphics processor 134, first to n-th interfaces 135-1 to 135-*n* (collectively "135"), and a bus 136.

The RAM 131, the ROM 132, the CPU 133, the graphics processor 134, the first to n-th interfaces 135, and the like may be connected to one another through the bus 136.

The first to n-th interfaces 135 are connected to the aforementioned various elements. One of the interfaces 135 may be a network interface that connects to an external apparatus via a network.

The CPU 133 may access the storage 140 to perform a booting sequence using an operating system (OS) stored in the storage 140. Then, the CPU 133 may perform various operations using various programs, and the like, stored in the storage 140. The CPU 133 may consist of two or more CPUs or CPU cores.

The ROM 132 may store an instruction set, and the like, for system booting. In response to a turn-on command being input and power being supplied, the CPU 133 may copy an OS stored in the storage 140 according to a stored instruction, and boot the system by executing the OS. Upon completion of the booting sequence, the main CPU 133 may copy various application programs stored in the storage 140 onto the RAM 131, and perform various operations by executing the application programs copied onto the RAM 131.

The graphics processor 134 may generate a screen that includes various graphical objects, such as an icon, an image, a text, and the like, using a computation unit and a rendering unit. The computation unit may compute an attribute value, such as a coordinate value at which each object will be displayed, a shape, a size, a color, and the like, according to a layout of the screen based on a received control command. The rendering unit may generate a screen of various layouts including an object based on an attribute value computed in the computation unit. The screen generated by the rendering unit may be projected onto a projection area by the projector 110.

Meanwhile, the aforementioned operations of the processor 130 may be performed by a program stored in the storage 140.

The storage 140 may store various types of data, such as an OS software module to drive the projection apparatus 100, an image processing module, an ID pattern detecting module, a mapping module of an ID pattern, and the like.

In particular, the processor 130 may generate an image by performing image processing on content based on information stored in the storage 140, and project the processed image.

The communicator 150 may communicate with various types of external apparatuses according to various types of communication methods. The communicator 150 may include a Wi-Fi chip 151, a Bluetooth chip 152, a wireless communication chip 153, a near field communication (NFC) chip 154, and the like. The processor 130 may communicate with various external apparatuses using the communicator 150.

The Wi-Fi chip 151 and the Bluetooth chip 152 may communicate in a Wi-Fi method and a Bluetooth method, respectively. When the Wi-Fi chip 151 or the Bluetooth chip 152 is used, the communicator 151 may first transceive various types of connection information, such as an Service Set Identifier (SSID), a session key, and the like, and access a network using the same, and then transceive various types of information. The wireless communication chip 153 may refer to an integrated circuit that communicates according to various communication standards and protocols, such as an Institute of Electric and Electronics Engineers (IEEE), a ZigBee, a 3rd Generation (3G), a 3rd Generation Partnership Project (3GPP), a Long Term Evolution (LTE), and the like. The NFC chip 154 may refer to an integrated chip that operates according to the NFC protocol that uses a 13.56 MHz band from among various radio-frequency identification (RFID) frequency bands, such as 135 kHz, 1.56 MHz, 433 MHz, 860 to 960 MHz, 2.45 GHz, and the like.

In addition, the communicator 150 may perform unidirectional communication or bidirectional communication with a projection apparatus. When performing unidirectional communication, the communicator may receive a signal from the projection apparatus. When performing bidirectional communication, the communicator may receive signals from the projection apparatus, and transmit signals to the projection apparatus.

The user interface 155 may receive various user interactions. The user interface 155 may receive inputs from a keyboard, a mouse, and the like. The user interface 155 may also be implemented as a remote controller receiver to receive a remote control signal from a remote control apparatus, a camera to detect a user motion, a microphone to receive a user voice, and the like.

If the projection apparatus 100 is implements a touch panel, the user interface 155 may further include a touch screen that forms an inter-layer structure with a touchpad. In this case, the user interface 155 may also be used as a display. In particular, a user may control the projection apparatus 100 by touching the surface of the display.

The audio processor 160 may perform processing with respect to audio data. The audio processor 160 may perform various processing tasks, such as decoding, amplification, noise filtering, and the like, regarding the audio data.

The video processor 170 may perform processing with respect to video data. The video processor 170 may perform various types of image processing, such as decoding, scaling, noise filtering, frame rate conversion, resolution conversion, and the like, regarding the video data.

The speaker 180 may output not only various types of audio data processed by the audio processor 160 but also various alert sounds, voice messages, and the like.

The button 181 may be a button of various types, such as a mechanical button, a touch pad, a wheel, a switch, a toggle, and the like, located in an area such as a front surface, a lateral surface, a rear surface, and the like, of the exterior of the projection apparatus 100. The user may interact with the button 181 to input commands, instructions, and the like to the projection apparatus 100.

The microphone 182 may receive an input of a user voice and other sounds, and convert the input into audio data.

FIGS. 3A to 3D are views provided to explain a projection position according to an exemplary embodiment.

Figure 3A:
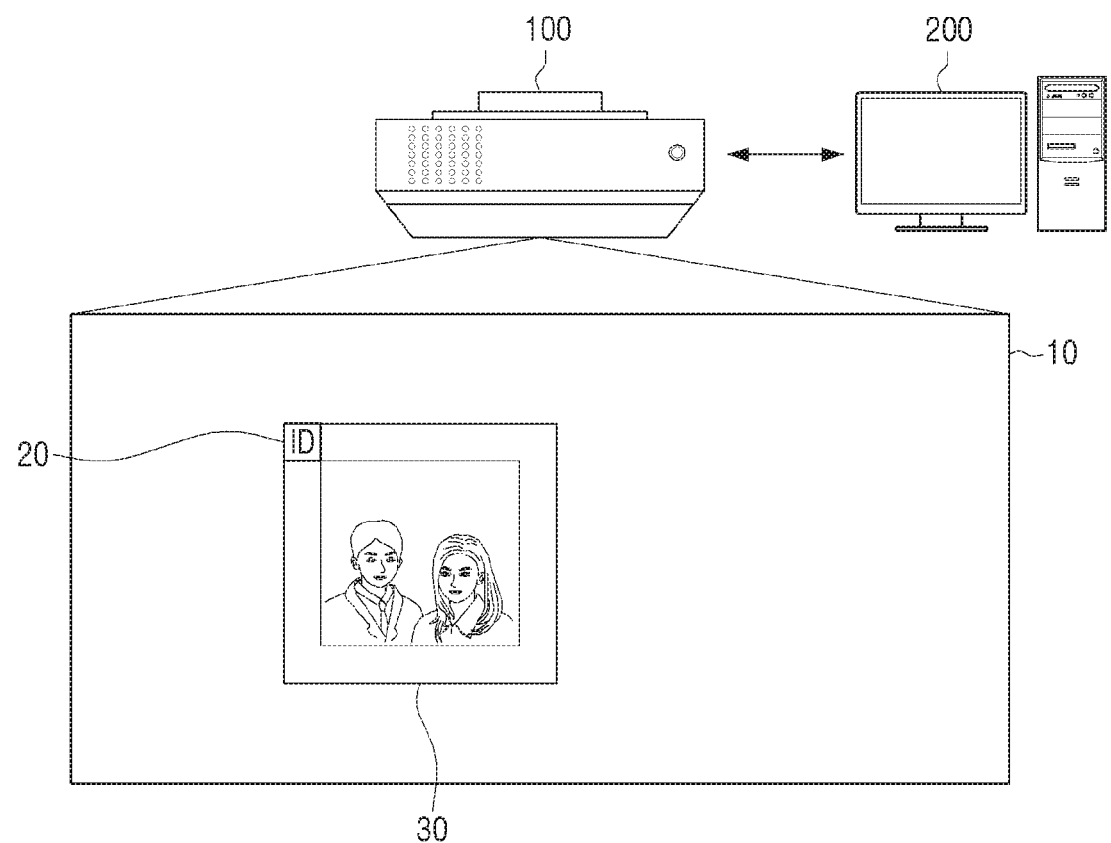

As illustrated in FIG. 3A, the processor 130 may generate a projection image including content received from a source apparatus corresponding to a detected ID pattern 20 such that the content is projected to a position corresponding to the detected ID pattern 20. For example, the processor 130 may receive an image from a computer 200, and generate a projection image such that the received image from the computer 200 is projected at a position that corresponds to the location of the ID pattern within the projection area 10.

Based on the detected ID pattern, the processor 130 may determine a corresponding source apparatus and the position to which content is to be projected. That is, the ID pattern 20 may include a unique identifier of the ID pattern 20 and information regarding an area to which content is to be projected. For example, the processor 130 may, as illustrated in FIG. 3B, extract the identifier, projection area, and projection position from the ID pattern 20.

The identifier may be a number or an alphanumeric value that represents or identifies the ID pattern 20. Thus, each ID pattern may be assigned an identifier to uniquely identify the ID pattern 20 within a given namespace. The processor 130 may determine a source apparatus corresponding to the ID pattern 20 based on the identifier. The detailed description follows below.

Figure 3B:
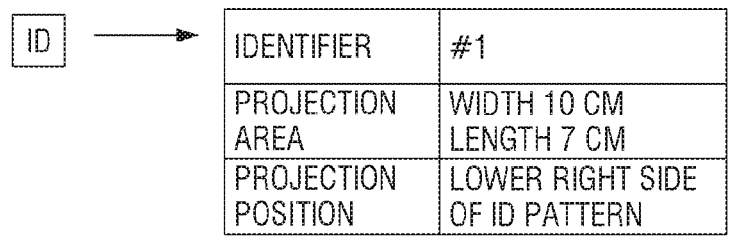

According to the exemplary ID pattern 20 shown in FIG. 3B, the projection area associated with the ID pattern 20 for the content corresponding to the ID pattern 20 may be a rectangle having a width of 10 cm and a length of 7 cm. However, the present disclosure is not limited in this regards. For example, an area to which content is to be projected may have a different shape, such as a circle, an oval, a diamond, and the like, with varying sizes, dimensions, and orientations. In addition, the area to which content will be projected may be based on a three-dimensional surface instead of a two-dimensional surface.

Similarly, although it is described in FIG. 3B that the projection position may be a lower right corner of the corresponding ID pattern, the present disclosure is not limited thereto. For example, the projection position may indicate any position and/or orientation relative to the position of the ID pattern 20. In addition, the projection position may be independent of the position where the ID pattern 20 is disposed. For example, the ID pattern 20 may store information indicating coordinates of the content to be projected relative to the entire projection area 10 of the projection apparatus 100.

The processor 130 may determine content to be projected based on the identifier of the ID pattern. That is, the projection apparatus 100 may further include storage to store mapping information between each ID pattern and a source apparatus and content. The processor 130 may receive content corresponding to the detected ID pattern from the source apparatus corresponding to the detected ID pattern based on the mapping information.

For example, the processor may, as illustrated in FIG. 3C, determine based on the mapping information that a corresponding source apparatus for the detected ID pattern with the identifier "#1" is a smartphone, and that corresponding content is schedule information of the smartphone. The mapping information may include unique identifiers for the source apparatuses, such as serial numbers, Internet Protocol (IP) addresses, or media access control (MAC) addresses. The mapping information may also include filenames or pathnames for the content.

Figure 3D:

In another example shown in FIG. 3D, the ID pattern 20 may include source information including source apparatus and the content to be displayed. In this example, the processor 130 may analyze the ID pattern 20 to determine that the source information is a captured image from a smartphone. The projection apparatus 100 may transmit a request to the smartphone for the captured image. Thus, in this case, the projection apparatus 100 may not need to store mapping information because the information about the source apparatus and the content is already included in the ID pattern 20.

Figure 4:
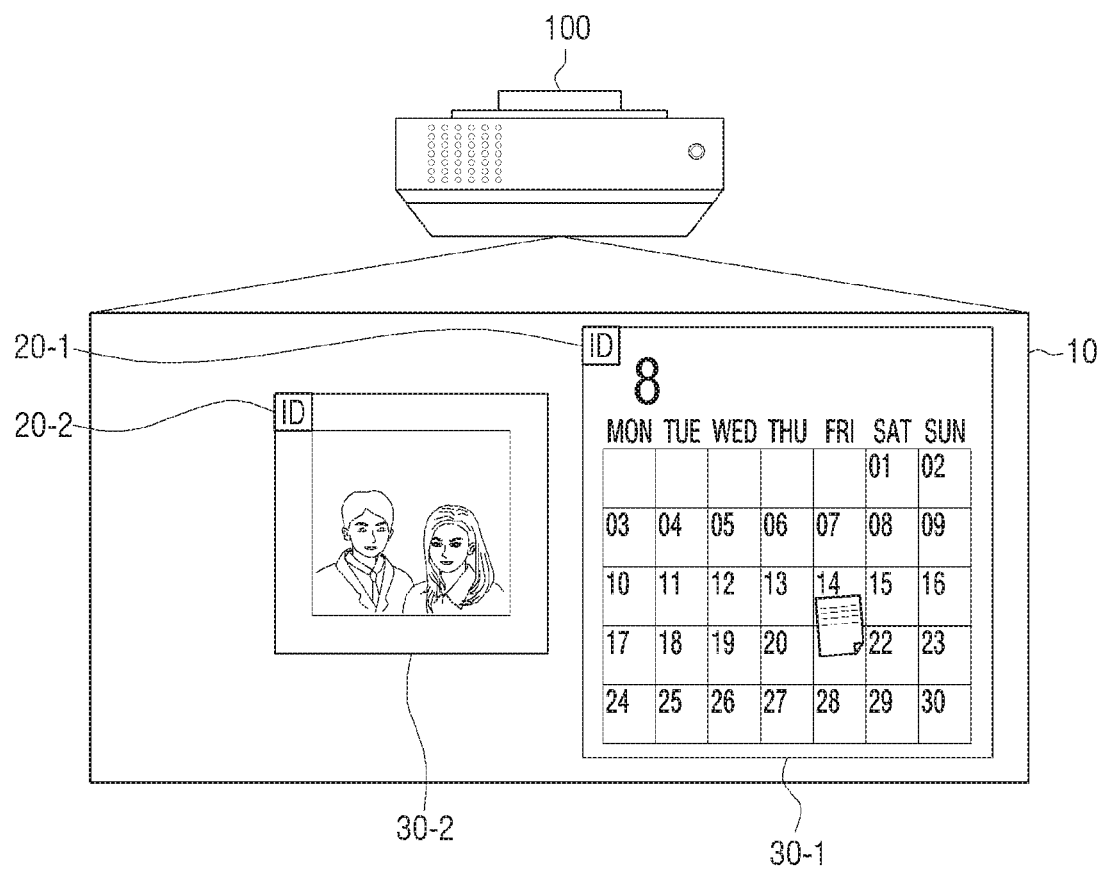
FIG. 4 is a view provided to explain an operation of receiving content and generating a projection image according to an exemplary embodiment.

FIG. 4 is a view provided to explain an exemplary operation of generating an image by receiving content.

As illustrated in FIG. 4, the processor 130 may generate a projection image that includes first content corresponding to a first detected ID pattern 20-1 and second content corresponding to a second detected ID pattern 20-2, such that the first content is projected to a first position 30-1 corresponding to the first ID pattern 20-1, and that the second content is projected to a second position 30-2 corresponding to the second ID pattern 20-2.

In particular, the processor 130 may receive the first content and the second content from at least one source apparatus. For example, the processor 130 may transmit a request to a smartphone corresponding to the first ID pattern 20-1 for schedule information corresponding to the first ID pattern 20-1. Similarly, the processor 130 may transmit another request to a desktop computer corresponding to the second ID pattern 20-2 for a video corresponding to the second ID pattern 20-2. The processor 130 may then receive the requested content from respective source apparatuses. In addition, the processor 130 may generate a projection image such that the schedule information from the smartphone and the video from the desktop computer respectively correspond to the position 30-1 corresponding to the first ID pattern 20-1 and the position 30-2 corresponding to the second ID pattern 20-2.

Alternatively, the processor 130 may receive first content corresponding to the first ID pattern 20-1 and second content corresponding to the second ID pattern from one source apparatus. For example, the processor 130 may transmit a request to a smartphone that corresponds to both the first ID pattern 20-1 and the second ID patter 20-2 for schedule information of the smartphone and a captured image of the smartphone, and receive the requested content.

However, the processor is not limited to receiving the content from an external source apparatus. For example, the processor 130 may generate a projection image using content stored in the projection apparatus 100. That is, the processor 130 may generate a projection image using schedule information of a smartphone corresponding to the first ID pattern 20-1 and an image stored in the projection apparatus 100 corresponding to the second ID pattern 20-2. In another example, the processor 130 may generate a projection image using an image stored in the projection apparatus 100 corresponding to the first ID pattern and a video stored in the projection apparatus 100 corresponding to the second ID pattern.

Figure 5A:
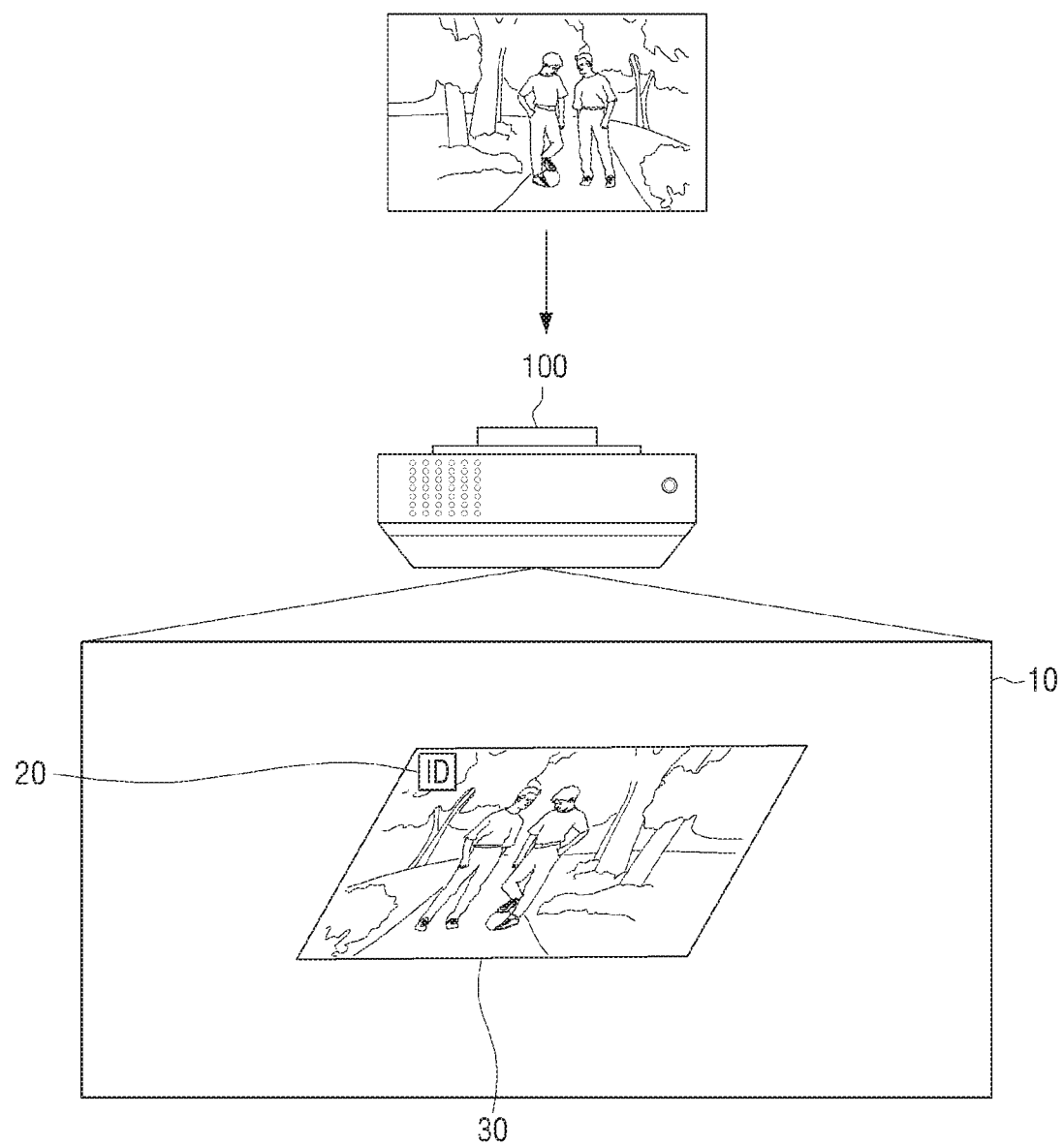
FIGS. 5A and 5B show an exemplary projection apparatus processing and projecting images.
Figure 5B:
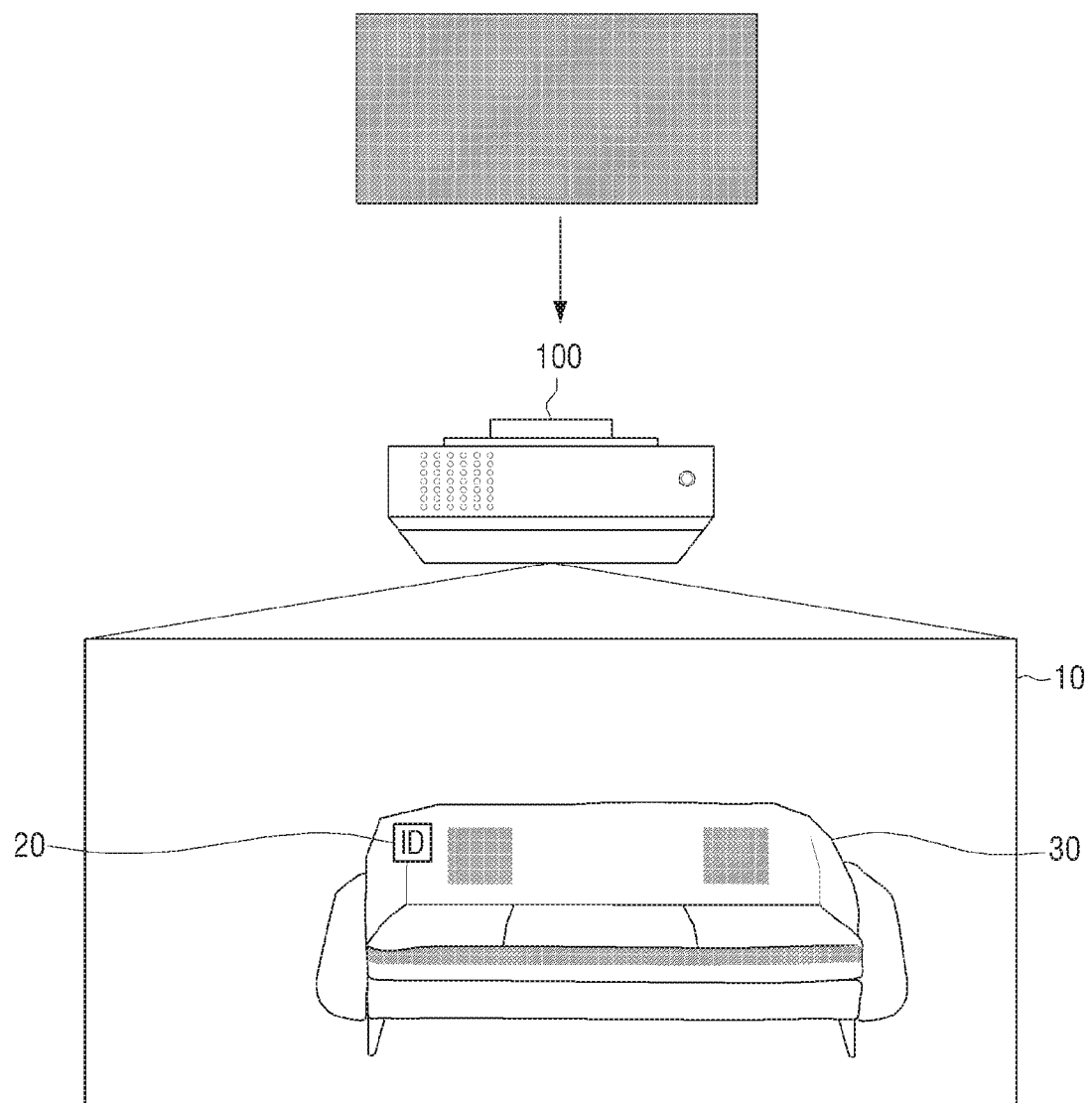

FIGS. 5A and 5B show the exemplary projection apparatus 100 processing and projecting images.

As illustrated in FIG. 5A, the processor 130 may generate a projection image by adjusting a size and/or shape of content based on information regarding the size and shape of an area corresponding to the ID pattern, included in the ID pattern 20. For example, the processor 130 may generate a projection image by modifying content having a rectangular shape into a parallelogram-shaped content corresponding to the information contained in the ID pattern 20. The processor 130 may also change the shape of content to any form other than a parallelogram. In addition, the processor 130 may change the size of content.

Alternatively, as illustrated in FIG. 5B, the processor 130 may generate a projection image by receiving a particular pattern image. Then, the processor 130 may generate a projection image such that the particular pattern is projected to a position corresponding to the ID pattern 20. For example, the processor 130 may receive an image having a checkered pattern, and generate a projection image such that the checkered pattern is projected onto a particular area on a piece of furniture 30 to which the ID pattern 20 is attached.

In this case, the ID pattern 20 may be attached to a three-dimensional object, such as furniture 30. In this case, the ID pattern 20 may store information regarding the three-dimensional object. The processor 130 may extract information regarding the three-dimensional object from the ID pattern 20 and generate a projection image such that the corresponding content is projected onto a surface of the three-dimensional object. In this case, the processor 130 may perform image processing on the content based on the surface of the three-dimensional object. For example, the processor 130 may take into account the contours and texture of the three-dimensional object when processing the content. The end result may be that the furniture 30 may appear to have the customized pattern or image projected and transposed onto the furniture 30.

Figure 6A:
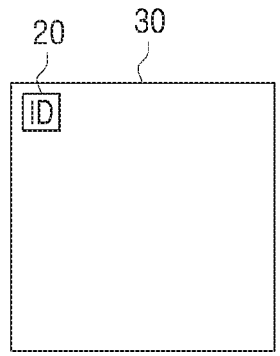
FIGS. 6A and 6B show a position of an area to which exemplary content may be projected.
Figure 6B:
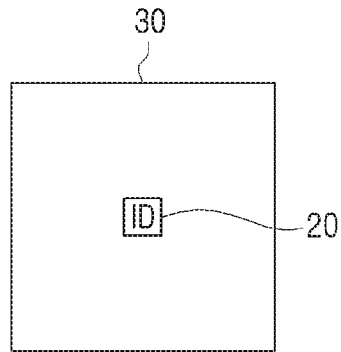

FIGS. 6A and 6B show a position of an area to which exemplary content may be projected.

As illustrated in FIG. 6A, the ID pattern 20 may be positioned in an upper left corner of an area to which content is to be projected. In this example, information contained in the ID pattern 20 may indicate that a lower right-hand side region relative to the position of the ID pattern 20 is an area 30 to which content is to be projected. In addition, the ID pattern 20 may contain further information about the size, dimensions, and orientation of the area 30. The processor 130 may determine the area 30 to which a content will be projected based on size information of an area stored in the ID pattern 20. Alternatively, as illustrated in FIG. 6B, the ID pattern 20 may be disposed at the center of the area 30 to which content will be projected.

However, the examples are not limited thereto, and the ID pattern 20 may include information regarding an absolute position, independent of the disposition of the ID pattern 20. For example, the ID pattern 20 may include information that the exact center in the overall projection area 10 is the position to which content is to be projected. In such a case, the processor 130 may, as long as the ID pattern 20 is disposed somewhere within the projection area 10, generate a projection image such that the content is projected to the center of the projection area 10, regardless of the disposition of the ID pattern 20. In other examples, the ID pattern 20 may include coordinates (e.g., x- and y-coordinates) of the position of the area 30, to which content is to be projected, within the overall projection area 10.

Additionally, the ID pattern 20 may include related information such that content may be projected onto a surface of a three-dimensional object. The detailed description will follow with respect to FIGS. 7A through 7C.

Figure 7A:
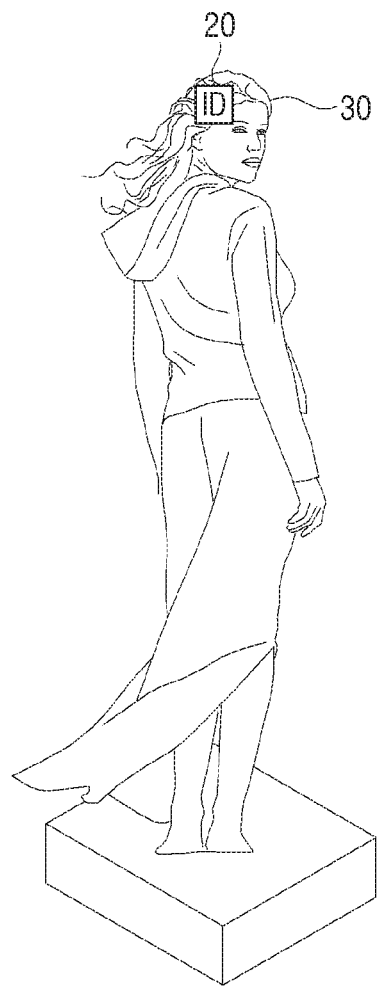
Figure 7B:
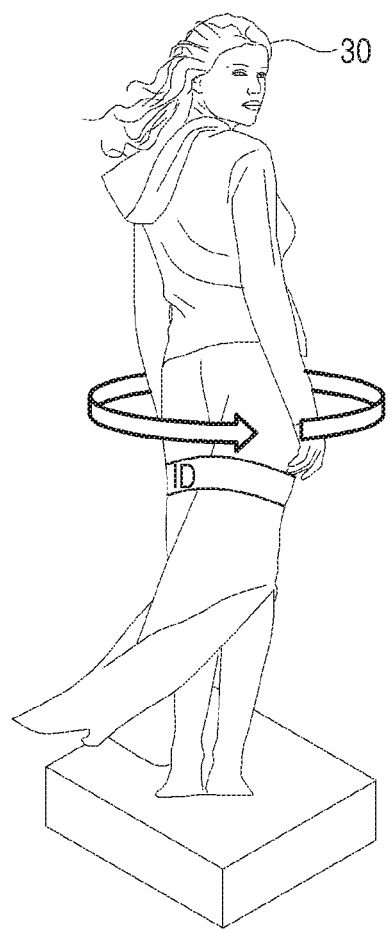
Figure 7C:
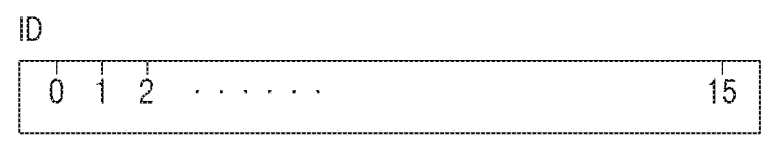

FIGS. 7A to 7C shown an exemplary embodiment for projecting content onto a three-dimensional object.

As illustrated in FIG. 7A, the processor 130 may generate a projection image by performing image processing on content such that the shape of the displayed content may correspond to an orientation of a three-dimensional object disposed in an area corresponding to an ID pattern 20, based on the information included in the ID pattern 20 on the orientation of the three-dimensional object. For example, the ID pattern 20 may include modeling information of an entire three-dimensional object and orientation information of the three-dimensional object. The processor 130 may determine an area 30 to be projected in the three-dimensional object based on the orientation information of the three-dimensional object, and generate a projection image to correspond to an area 30 to which content will be projected, based on the modeling information of the entire three-dimensional object.

In addition, as illustrated in FIG. 7B, the ID pattern 20 may be disposed to surround a three-dimensional object. In particular, the ID pattern may, as illustrated in FIG. 7C, include numerical figures for identifying more than one locations and/or orientations in a three-dimensional space. The processor 130 may extract the numerical figures from an area of a detected ID pattern 20 and determine an orientation of the three-dimensional object.

For example, the ID pattern 20 may include numerical figures ranging from 0 to 15, and the processor 130 may, in response to the numerical figures in the range of 3 to 7 being extracted from a detected ID pattern 20, determine that a side of a mannequin, which is a three-dimensional object, is the area 30 to which content is to be projected. Alternatively, the ID pattern 20 may include one or more markers that identify spatial relationships within the three-dimensional space in order to assist the projection apparatus 100 to determine the position and orientation of the three-dimensional object to which the ID pattern 20 is affixed.

Although a particular numerical figure may be included for each segment of the ID pattern 20, the present disclosure is not limited thereto. For example, each segment of the ID pattern may store a particular pattern representing an orientation of a three-dimensional object.

In addition the processor 130 may, in response to receiving a user input to change a color or a texture of an object, generate a projection image by performing image processing on content such that the color or the texture of the content may also change according to the received user input.

Figure 8:
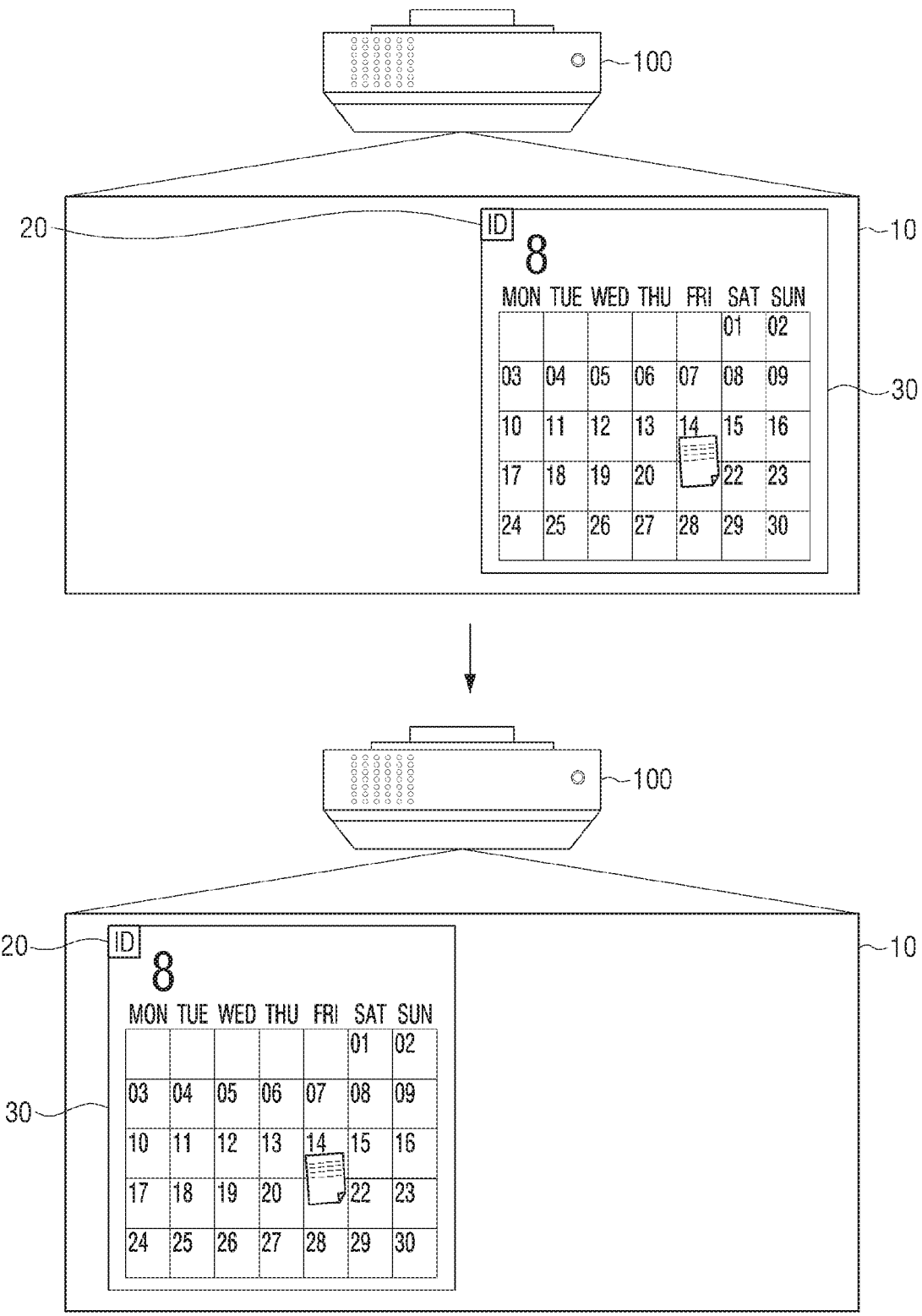
FIG. 8 shows a movement of an exemplary ID pattern.

FIG. 8 shows a movement of the exemplary ID pattern 20.

As illustrated in FIG. 8, the processor 130 may, in response to a position of a detected ID pattern 20 being changed, generate a projection image such that the position to which content is projected would change based on the new position of the ID pattern 20. For example, when the ID pattern 20 is originally detected on the right side of the projection area 10, the processor 130 may generate a projection image such that the content is projected on the right side of the projection area 10 around the ID pattern 20. However, when the ID pattern 20 moves to the left side of the projection area 10, the processor 130 may update the projection image such that the content is now projected on the left side of the projection area 10 around the new location of the ID pattern 20. The content may move across the image projected on the projection area 10 in real time to coincide with the real-time positions of the ID pattern 20. That is, a user may change a desired area of projection by physically moving the ID pattern 20 to the new location.

The processor 130 may also track positions of multiple ID patterns being moved across the projection area 10 and update the projection image in real time such that corresponding content would respectively track the moving ID patterns.

Figure 9:
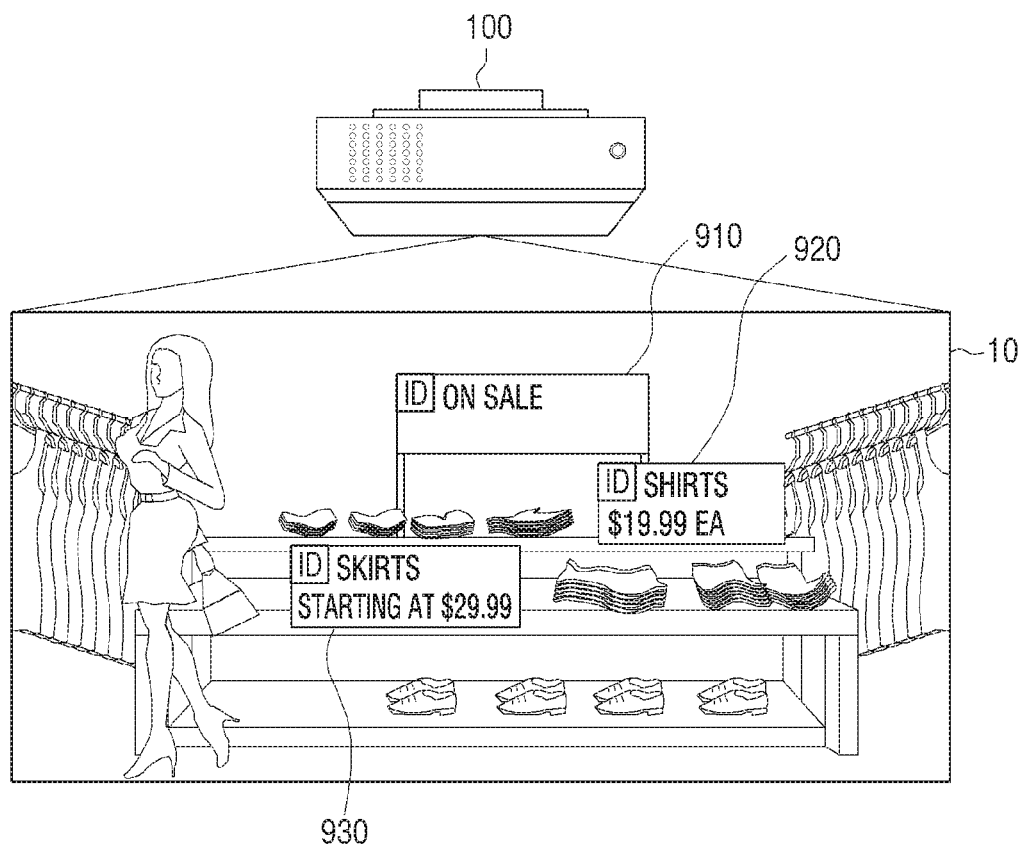
FIG. 9 shows an exemplary usage of a projection apparatus in a retail environment.

FIG. 9 shows an exemplary use of a projection apparatus in a retail environment.

As illustrated in FIG. 9, the processor 130 may generate a projection image such that pre-stored information is projected to an area corresponding to an ID pattern. For example, the processor 130 may generate a projection image such that the words, "On Sale," are projected to an area 910 corresponding to a first ID pattern. Additionally, the generated projection image may also include the words, "Shirts $19.99," projected to an area 920 corresponding to a second ID pattern. Finally, the generated projection image may further include the words, "Skirts Started At $29.99," projected to an area 930 corresponding to a third ID pattern.

In this example, a user may set or modify text or images to be displayed by the projection apparatus 100. In addition, when a user moves an ID pattern to a new location, the processor 130 may update the projection image based on the new position of the ID pattern. In addition, the processor 130 may receive input from the user in real time and change the text accordingly.

Figure 10A:
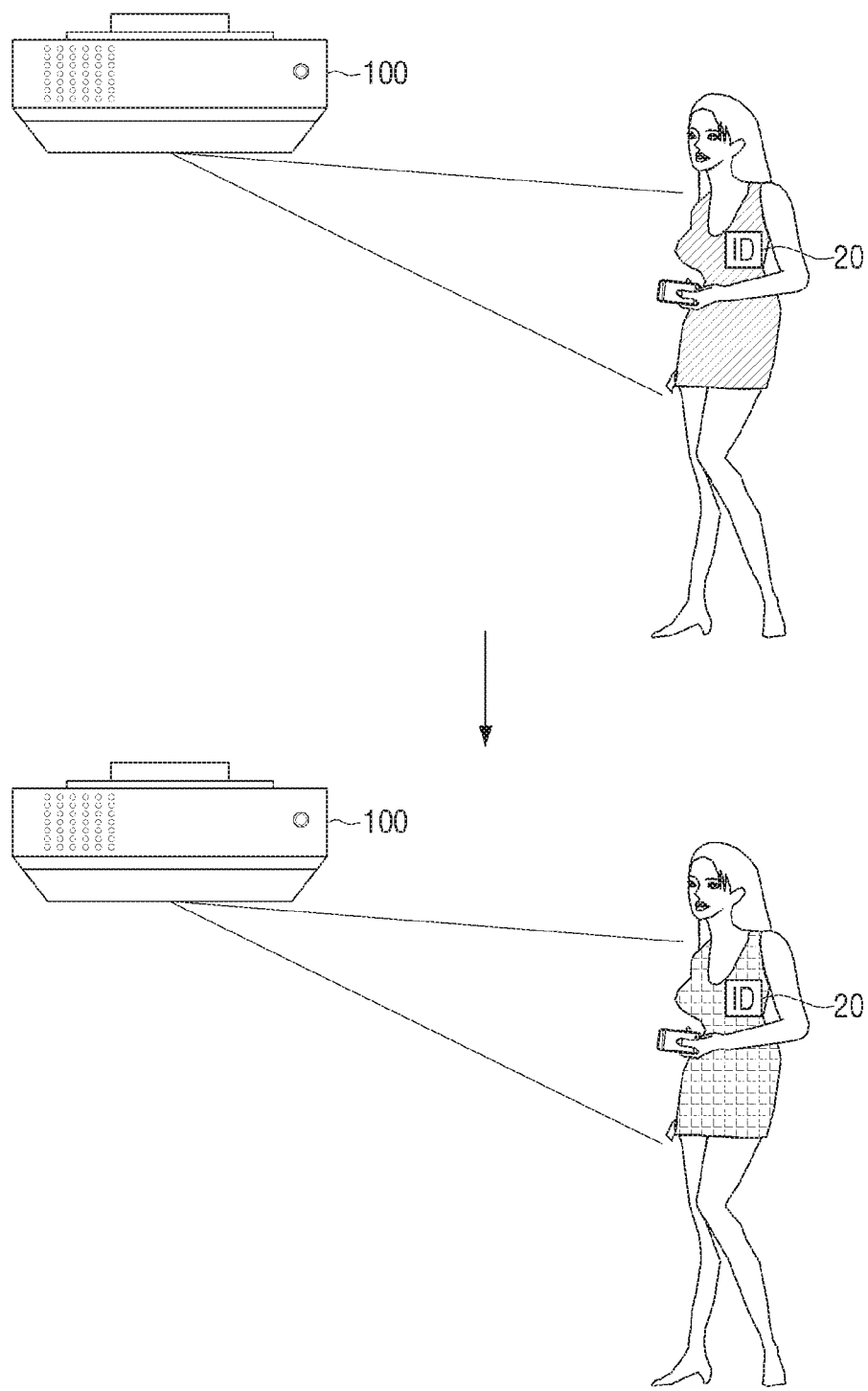
FIGS. 10A and 10B are views provided to show an exemplary operation when a user input is received.
Figure 10B:
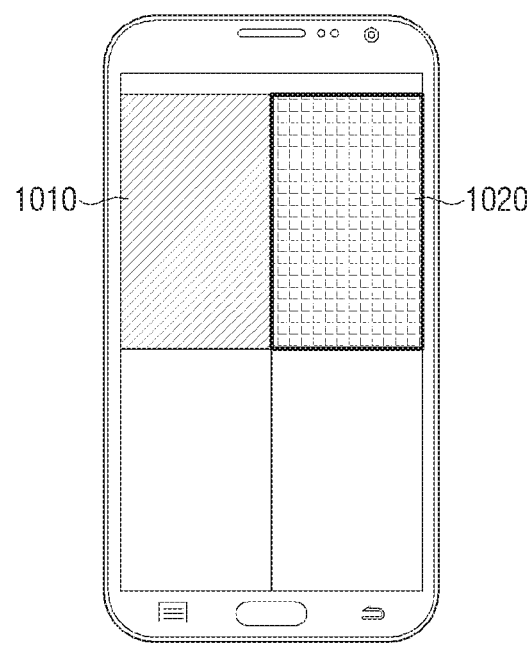

FIGS. 10A and 10B are views provided to show an exemplary operation when a user input is received.

As illustrated in FIG. 10A, the processor 130 may, after receiving a user input to change the color or the texture of an object, generate a projection image by performing image processing on content such that the color or the texture of the displayed content is changed based on the received user input.

For example, the processor 130 may, when a user stands within the projection area 10 wearing a dress to which the ID pattern 20 is attached, detect the ID pattern 20, and generate a projection image such that a stripe pattern is projected to an area corresponding to the ID pattern 20, and project the image onto the dress.

Subsequently, in response to the pattern being changed by the user, the processor 130 may update the projection image such that a checker pattern is now projected onto the area corresponding to the ID pattern 20, and project the updated image onto the dress.

In this example, the processor 130 may interact with an electronic apparatus that the user has. The user electronic apparatus, such as a terminal, a kiosk, a mobile device, a smartphone, or the like, may provide a user interface for selecting, modifying, or controlling the content to be displayed by the projection apparatus 100 onto the projection area 10. For example, as illustrated in FIG. 10B, a smartphone of a user may be provided with a user menu to control the projection apparatus 100. When the user selects a checkered pattern 1020 instead of a stripe pattern 1010, a signal indicating the selection of the checkered pattern 1020 is transmitted from the smartphone to the projection apparatus 100, and the processor 130 may generate a projection image based on the received signal indicating the selection of the checkered pattern 1020.

Figure 11:
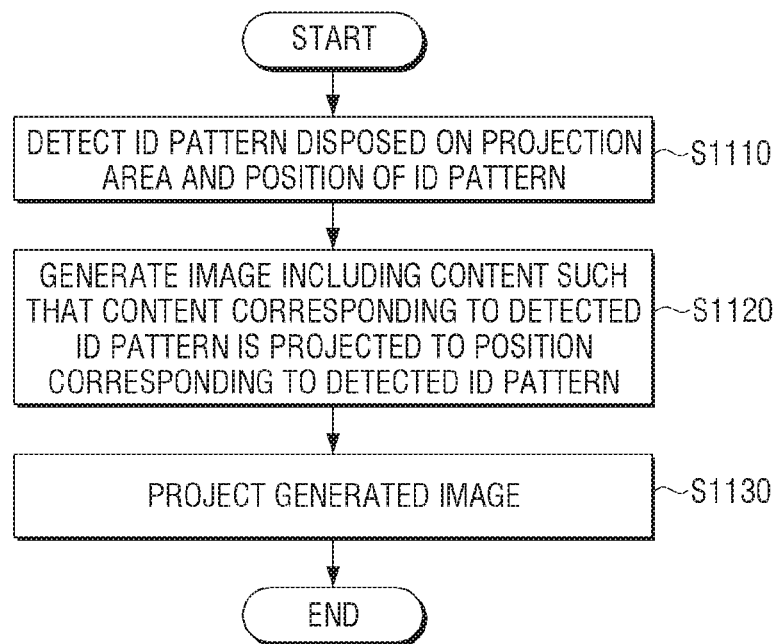
FIG. 11 shows a flowchart of an exemplary method of controlling a projection apparatus.
Figure 12:
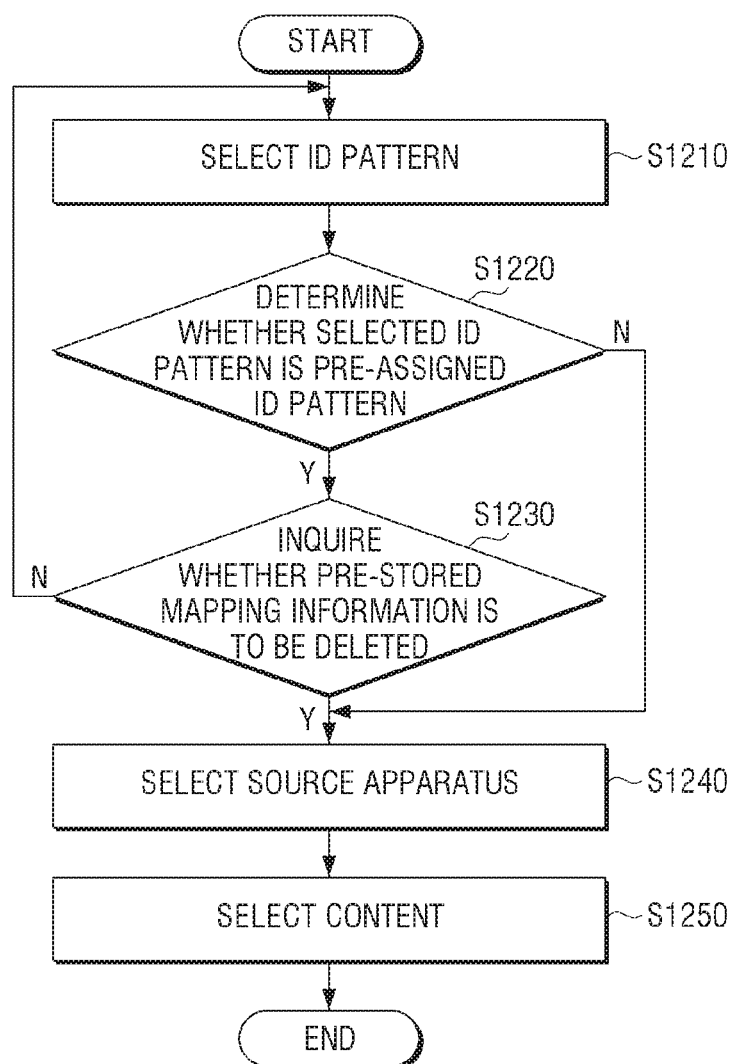
FIG. 12 shows a flowchart of an exemplary method of setting mapping information.
Figure 13:
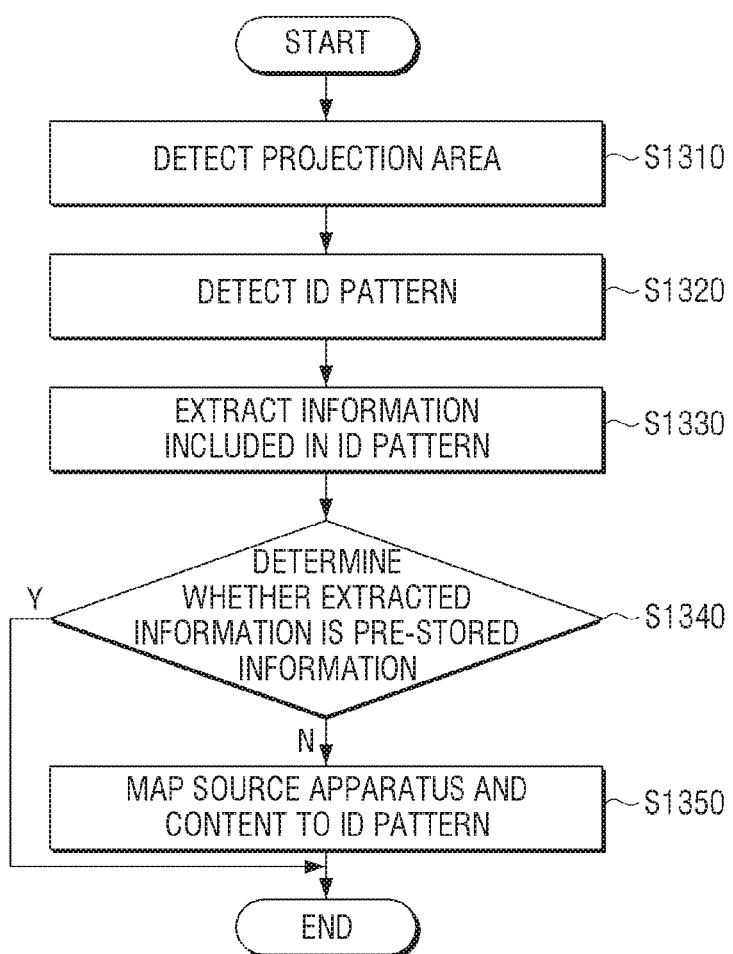
FIG. 13 shows a flowchart of an exemplary operation of a projection apparatus after an ID pattern is detected.

Having disclosed some basic system components and concepts, the disclosure now turns to exemplary method embodiments shown in FIGS. 11-13. For the sake of clarity, the method is described in terms of an exemplary projection system 1000 as shown in FIG. 1 configured to practice the methods. However, other components and systems described in this disclosure may also perform any of the steps disclosed herein. The steps outlined herein are exemplary and can be implemented in any combination thereof, including combinations that exclude, add, or modify certain steps.

FIG. 11 shows a flowchart of an exemplary method of controlling a projection apparatus.

First, the system 1000 may detect an ID pattern disposed onto a projection area and a position of the ID pattern (S1110). Then, the system 1000 may generate a projection image including content corresponding to a detected ID pattern such that the content is projected to a position corresponding to the detected ID pattern (S1120). Then, the system may project the generated image (S1130).

In this exemplary method, the generating (S1120) may include generating a projection image including content received from a source apparatus corresponding to the detected ID pattern such that the content is projected to a position corresponding to the detected ID pattern.

Additionally, the generating (S1120) may include first content corresponding to a first detected ID pattern and second content corresponding to a second detected ID pattern such that the first content is projected to a first position corresponding to the first ID pattern and that the second content is projected to a second position corresponding to the second ID pattern.

In particular, the exemplary method may further include receiving the first content and the second content from at least one source apparatus.

The generating (S1130) may include generating a projection image by adjusting a size or a shape of the content based on information included in the ID pattern regarding the size or the shape of an area corresponding to the ID pattern.

The generating (S1130) may also include generating a projection image by performing image processing on the content such that a shape of the content corresponds to an orientation of a three-dimensional object disposed in an area corresponding to an ID pattern, based on information included in the ID pattern regarding the orientation of the three-dimensional object.

In such a case, the generating (S1130) may include, in response to a user input being received to change a color or a texture of an object, generating a projection image by performing image processing on the content such that the color or the texture of the content is changed based on the received user input.

The generating (S1130) may include, in response to a position of a detected ID pattern being changed, generating a projection image such that an area to which the content is projected is changed based on the changed position of the ID pattern.

In addition, the exemplary method may further include receiving content corresponding to a detected ID pattern from a source apparatus corresponding to the detected ID pattern based on mapping information of the ID pattern regarding the source apparatus and content.

The ID pattern may include an identifier to identify an ID pattern and information regarding an area to which content will be projected.

FIG. 12 shows a flowchart of an exemplary method of setting mapping information.

First, the system 1000 may select any one of a plurality of detected ID patterns (S1210). Then, the system 1000 may determine whether the selected ID pattern is a pre-assigned ID pattern (S1220). For example, the pre-assigned ID pattern may refer to an ID pattern that stores mapping information regarding the ID pattern. If, however, the selected ID pattern does not store mapping information regarding the ID pattern, then the pattern is not a pre-assigned ID pattern.

If the selected ID pattern is a pre-assigned ID pattern, the system 1000 may determine whether pre-stored mapping information is to be deleted. When pre-stored mapping information is deleted, or the selected ID pattern is not a pre-assigned ID pattern, the system 1000 may select a source apparatus (S1240). When the pre-stored mapping information is not to be deleted, an ID pattern may be selected again (S1210).

After a source apparatus is selected, the system 1000 may select content (S1250). In such a case, the content may include content provided by the source apparatus.

FIG. 13 shows a flowchart of an exemplary operation of a projection apparatus after the detection of ID pattern.

First, the system 1000 may detect a projection area (S1310). Then, the system 1000 may detect an ID pattern (S1320). The system 1000 may extract information that is included in the ID pattern (S1330). The information included in the ID pattern may be an identifier that uniquely identifies the ID pattern, information on an area to which the content will be projected, or orientation information of an object.

Then, the system 1000 may determine whether the extracted information is pre-stored information (S1340). When the extracted information is not pre-stored information, the system 1000 may map a source apparatus and content to the ID pattern (S1350). However, when the extracted information is pre-stored information, the system 1000 may generate an image such that corresponding content is projected to a position that corresponds to the ID pattern.

Figure 14:
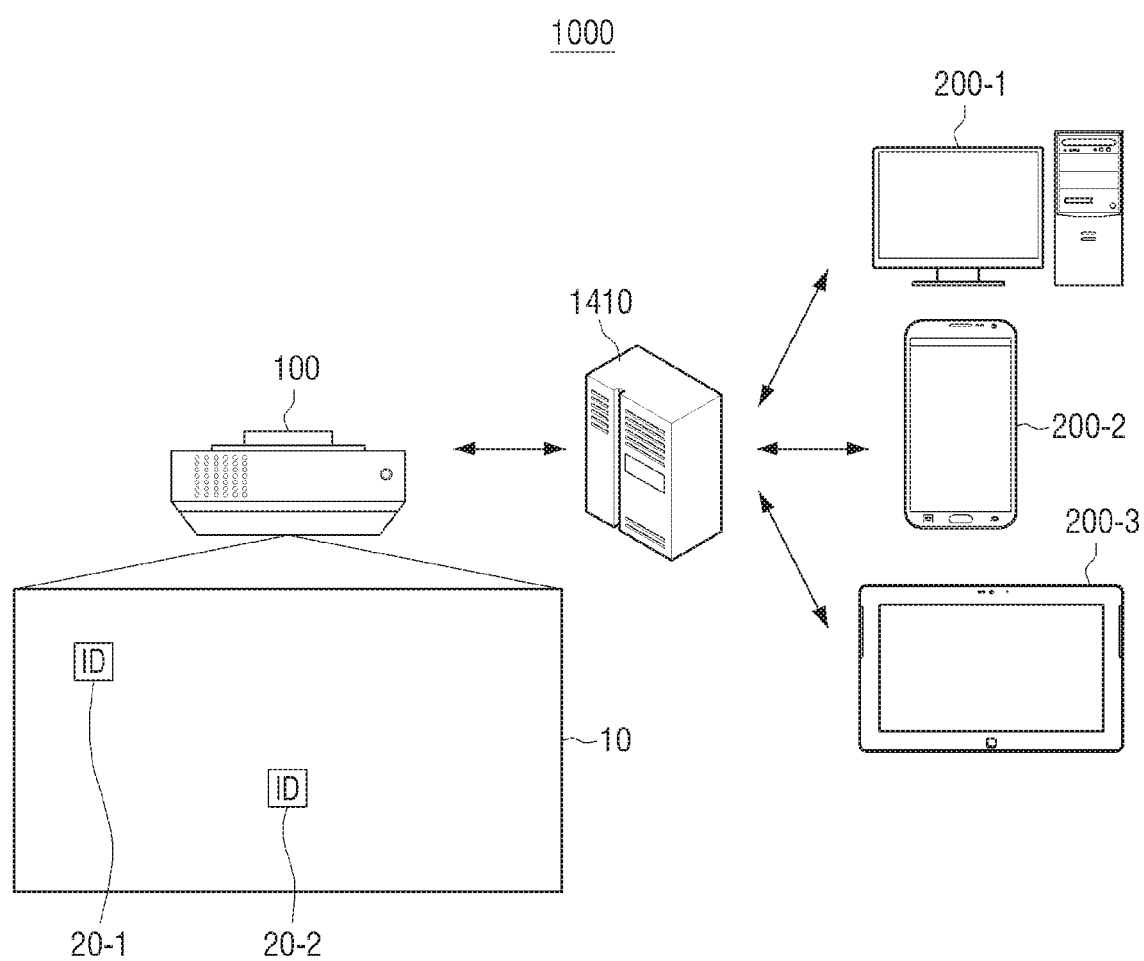
FIG. 14 shows an embodiment of an exemplary projection apparatus.

FIG. 14 shows an embodiment of an exemplary projection apparatus.

As illustrated in FIG. 14, generating and projecting an image may be performed by different apparatuses.

For example, a projector system 1000 may additionally have a server 1410 to perform a function of generating an image, in addition to a projection apparatus 100, source apparatuses 200-1, 200-2, 200-3 (collectively "200"), a projection area 10, and ID patterns 20-1 and 20-2 (collectively "20") disposed on the projection area 10. In this example, the server 1410 may be replaced with other apparatuses, such as a desktop computer, a laptop computer, and the like.

The server 1410 may receive information regarding detected ID patterns 20 from the projection apparatus 100, and thereby transmit a request for content to the source apparatuses 200. The server 1410 may generate a projection image such that the received content may be projected by the projection apparatus 100 to positions corresponding to the detected ID patterns 20, and transmit the generated projection image to the projection apparatus 100.

In this exemplary embodiment, the projection apparatus 100 may detect ID patterns 20 within the projection area 10 and project an image generated by the server 1410.

Figure 15:
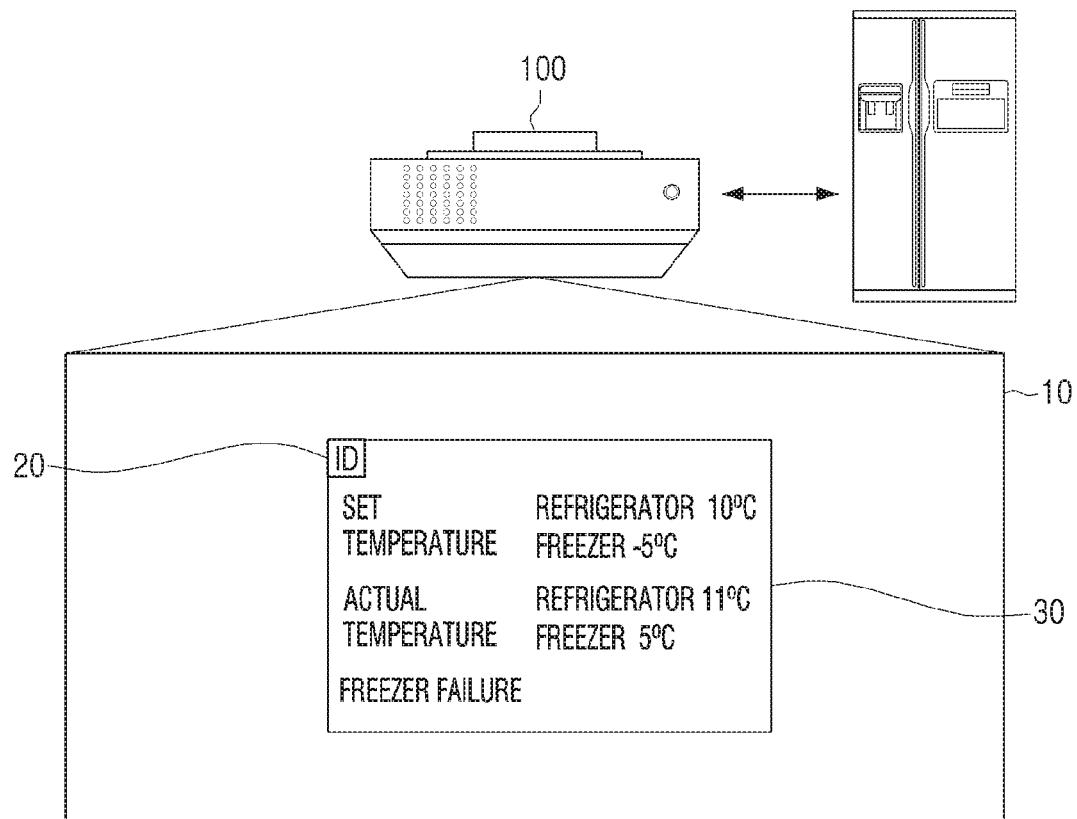
FIG. 15 shows another embodiment of an exemplary projection apparatus.

FIG. 15 shows another embodiment of an exemplary projection apparatus.

As illustrated in FIG. 15, text and other graphical objects may be received, and a projection image may be generated such that the content is projected to an appropriate position.

For example, a projection apparatus 100 may receive, from a refrigerator, information regarding an operational state of the refrigerator. In particular, the information regarding the operational state of the refrigerator may be in the form of text.

The projection apparatus 100 may analyze the operational state to determine whether the refrigerator is operating appropriately, and generate a table or chart based on a result of the determination and the received information. The projection apparatus 100 may generate a projection image such that the generated table is projected to a position corresponding to an ID pattern 20.

According to various exemplary embodiments, a projection apparatus is to generate a projection image based on an ID pattern detected within a projection area, and project the generated image, enabling a user to change the position of the ID pattern and to readily change the position of the projected image.

Although it is described above that the projection apparatus may extract information regarding an area corresponding to an ID pattern, the disclosure is not limited thereto. For example, an ID pattern itself may be a projection area, and the projection apparatus may generate a projection image such that the content is projected onto the detected ID pattern.

In particular, in the exemplary embodiment shown in FIG. 10, the projection apparatus may detect the clothes of the mannequin and generate a projection image such that the content may be projected onto the clothes without the need to attach an additional ID pattern to the clothes.

The aforementioned methods of controlling the projection apparatus may be implemented as a software program, code, or instructions executable by a processor, and the program, code, or instructions may be stored in a non-transitory computer-readable medium to be executed by a processor.

For example, a non-transitory computer readable medium which stores a program to sequentially perform detecting an ID pattern disposed onto a projection area and a position of the ID pattern, generating a projection image including content corresponding to the detected ID pattern such that the content is projected to a position corresponding to the detected ID pattern, and projecting the generated image may be provided.

A non-transitory computer readable medium may refer to a machine-readable medium or device that stores data semi-permanently and not for a short period of time such as a register, cache, memory, and the like. The aforementioned various applications or programs may be stored in a non-transitory computer readable medium such as a compact disc (CD), a digital versatile disc (DVD), a hard disk, a Blu-ray disc, a Universal Serial Bus (USB) stick, a memory card, a ROM, etc.

Further, the above one or more exemplary embodiments describe non-limiting exemplary embodiments, which may be modified and embodied by one of ordinary skill without going beyond the concept of the present disclosure recited in the claims as well, and these modified embodiments should not be understood individually from the technical idea or prospect of the present disclosure.

What is claimed is:

1. A projection apparatus comprising:
   a projector;
   a communication interface;
   a memory configured to store mapping information that associates detectable identification (ID) patterns with a plurality of source apparatuses and a plurality of pieces of content;
   a detector; and
   a processor configured to:
      control the detector to detect an ID pattern physically attached to a projection area and detect a position of the ID pattern,
      identify, based on the stored mapping information, a source apparatus associated with the detected ID pattern from among the plurality of source apparatuses,
      receive, from the identified source apparatus associated with the detected ID pattern via the communication interface, content corresponding to the detected ID pattern from the identified source apparatus associated with the detected ID pattern,
      obtain a projection image that includes the content such that the content is projected to an area in the projection area identified based on the position of the detected ID pattern, and
      control the projector to project the obtained projection image in the projection area.

2. The projection apparatus as claimed in claim 1, wherein the processor is further configured to obtain the projection image including first content corresponding to a first detected ID pattern and second content corresponding to a second detected ID pattern such that the first content is projected, via the projector, to a first position corresponding to the first detected ID pattern and that the second content is projected, via the projector, to a second position corresponding to the second detected ID pattern.

3. The projection apparatus as claimed in claim 2, wherein the processor is further configured to receive the first content and the second content from at least one source apparatus.

4. The projection apparatus as claimed in claim 1, wherein the processor is further configured to obtain the projection image by adjusting at least one of a size and a shape of the content based on information regarding the at least one of the size and the shape of an area corresponding to the detected ID pattern, the information regarding the at least one of the size and the shape of the area corresponding to the detected ID pattern being included in the detected ID pattern.

5. The projection apparatus as claimed in claim 1, wherein the processor is further configured to obtain the projection image by performing image processing on the content such that a shape of the content corresponds to an orientation of a three-dimensional object disposed in an area corresponding to the detected ID pattern, based on information regarding the orientation of the three-dimensional object, the information regarding the orientation of the three-dimensional object being included in the detected ID pattern.

6. The projection apparatus as claimed in claim 5, wherein the processor is further configured to, based on a user input being received to change at least one of a color and a texture of the three-dimensional object, obtain the projection image by performing image processing on the content such that the at least one of the color and the texture of the content is changed, based on the received user input.

7. The projection apparatus as claimed in claim 1, wherein the processor is further configured to, based on the position of the detected ID pattern being changed, update the obtained projection image such that the content is projected onto the changed position of the detected ID pattern.

8. The projection apparatus as claimed in claim 1, wherein information stored in the detected ID pattern comprises at least one of identification information that uniquely identifies the detected ID pattern or information regarding an area to which the content is projected.

9. A method comprising:
   detecting an identification (ID) pattern physically attached to a projection area and detecting a position of the ID pattern;
   identifying, based on stored mapping information, a source apparatus associated with the detected ID pattern from among a plurality of source apparatuses, wherein the stored mapping information associates detectable ID patterns with the plurality of source apparatuses and a plurality of pieces of content;
   receiving, from the identified source apparatus associated with the detected ID pattern via a communication interface, content corresponding to the detected ID pattern from the identified source apparatus associated with the detected ID pattern;
   obtaining a projection image that includes the content such that the content is projected to an area in the projection area identified based on the position of the detected ID pattern; and
   projecting the obtained projection image in the projection area.

10. The method as claimed in claim 9, wherein the obtaining comprises obtaining the projection image including first content corresponding to a first detected ID pattern and second content corresponding to a second detected ID pattern such that the first content is projected to a first position corresponding to the first detected ID pattern and that the second content is projected to a second position corresponding to the second detected ID pattern.

11. The method as claimed in claim 10, further comprising receiving the first content and the second content from at least one source apparatus.

12. The method as claimed in claim 9, wherein the obtaining comprises:
   adjusting at least one of a size and a shape of the content based on information regarding the at least one of the size and the shape of an area corresponding to the detected ID pattern to yield adjusted content, the information regarding the at least one of the size and the shape of the area corresponding to the detected ID pattern being included in the detected ID pattern; and
   obtaining the projection image based on the adjusted content.

13. The method as claimed in claim 9, wherein the obtaining comprises obtaining the projection image by performing image processing on the content such that a shape of the content corresponds to an orientation of a three-dimensional object disposed in an area corresponding to the detected ID pattern based on information regarding the orientation of the three-dimensional object, the information regarding the orientation of the three-dimensional object being included in the detected ID pattern.

14. The method as claimed in claim 13, wherein the obtaining comprises, based on a user input being received to change at least one of a color and a texture of the three-dimensional object, obtaining the projection image by performing image processing on the content to change the at least one of the color and the texture of the content based on the received user input.

15. The method as claimed in claim 9, wherein the obtaining comprises, based on the position corresponding to the detected ID pattern being changed, updating the obtained projection image such that the content is projected onto the changed position corresponding to the detected ID pattern.

16. The method as claimed in claim 9, wherein information stored in the detected ID pattern comprises at least one of identification information that uniquely identifies the detected ID pattern or information regarding an area to which the content is projected.

* * * * *